Z. R. HENCH.
Bee Hive.
No. 2,814.  Patented Oct. 12, 1842.
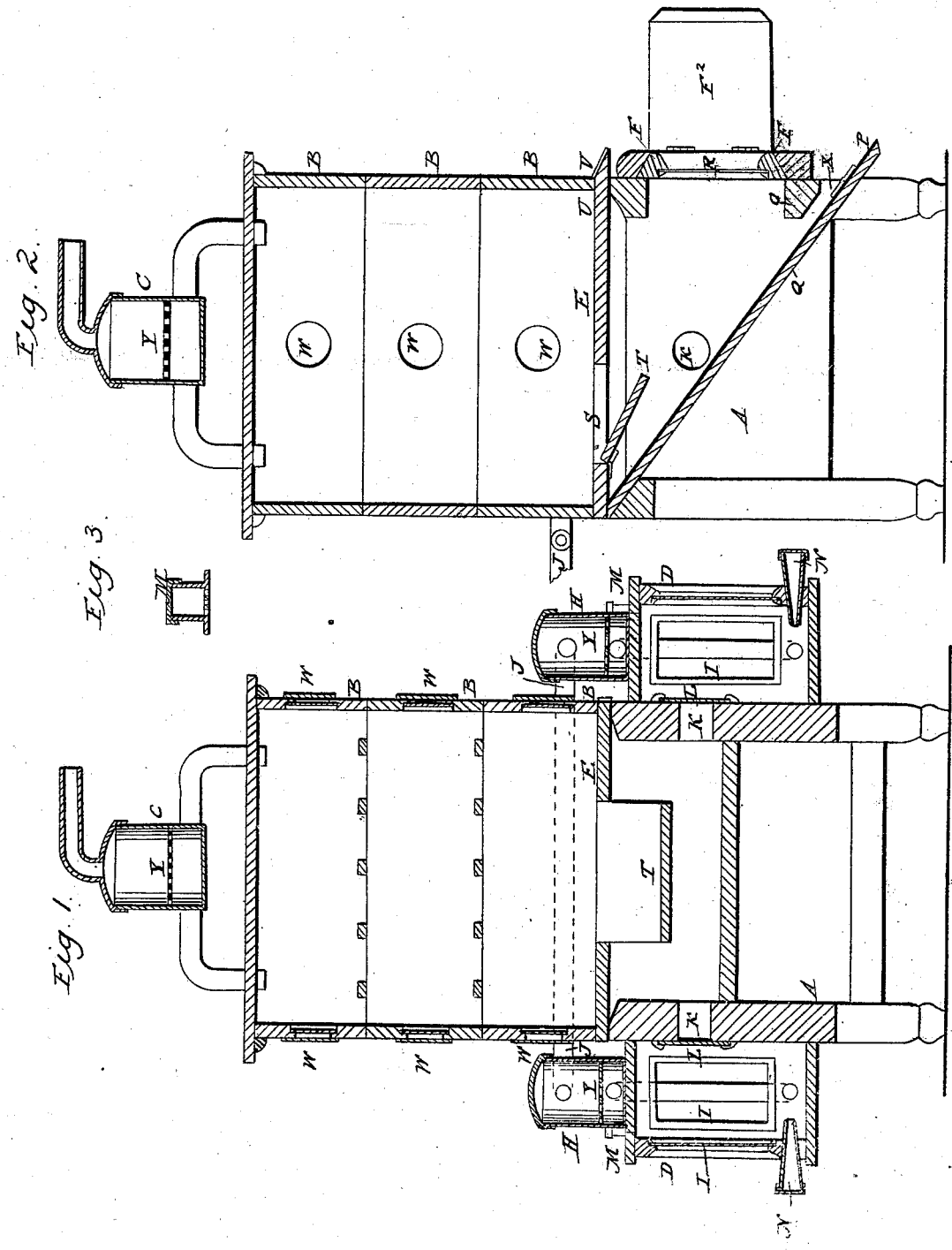

UNITED STATES PATENT OFFICE.

ZACHARIAH R. HENCH, OF PORT ROYAL, PENNSYLVANIA.

BEEHIVE.

Specification of Letters Patent No. 2,814, dated October 12, 1842.

*To all whom it may concern:*

Be it known that I, ZACHARIAH R. HENCH, of Port Royal, in the county of Juniata and State of Pennsylvania, have invented a new and useful Improvement in Beehives, which is described as follows, reference being had to the annexed drawings of the same making part of this specification.

Figure 1 is a longitudinal section of the hive. Fig. 2 is a transverse section. Fig. 3 is a section of one of the ventilators.

The stand A of the bee house, the boxes B in which the bees deposit their honey, the fumigator C for driving the bees out of the boxes in taking the honey are made in the usual manner, except in the particulars hereafter stated.

The principal improvements that I have made in the hive and for which I solicit Letters Patent, are in the peculiar construction and arrangement of two glazed side boxes D attached to the hive for attracting and securing the bees during the operation of taking the honey, or for colonizing bees; and also for catching strange bees that come to the hive to rob it:—and also in the construction and arrangement of a swarming board E for facilitating the increase of the stock of bees and likewise in the addition of a sliding frame F and window with a door F² and perforated slide G to the stand for ventilating the hive during the operation of catching the strange bees or robbers. And also in the addition of ventilators and fumigators H to the side boxes for again driving the bees from said boxes into the bee house—said fumigators being also used as side ventilators for supplying air to the side boxes during the operation of smoking the bees from the hive into the side boxes, by means of a common bellows, acting on both side fumigators at the same time by having a branched tube J extending from a central pipe into which the nozzle of the bellows is inserted, to each fumigator H.

The side boxes D are of a rectangular or other form and are attached to the sides of the stand A by dovetails and grooves, or with screws, hooks and eyes, staples or in any convenient way. It has three sides and a top and bottom. The third side next the hive stand is omitted. The three sides are provided with panes of glass I for admitting light to the boxes for the purpose of attracting the bees from the hive through an opening K in the stand. This opening is closed or opened with a slide L at pleasure for opening or shutting the communication from the stand to the boxes.

The side fumigators and ventilators H are of a cylindrical or other form of any required diameter and length having each a movable cap or lid removable at pleasure for the admission of the fumigating substance fire and air and a branch tube for the blast from a bellows, grates, and other tubes for conveying the smoke or air down outside the boxes and in through the lower part of the same.

Two perforated ventilators M Fig. 3 with movable caps are placed in the tops of the boxes D.

A funnel shaped tube N is inserted horizontally into the side of each box D for allowing the strange bees or robbers to enter the boxes from which they cannot escape through the aforesaid funnel shaped tubes at which they entered on account of their tapered shape and being attracted upward by the light of the glass sides. These tubes are closed at the larger ends with caps when not required to be used or to secure the robbers when taken. In order to ascertain to whom the thieving bees belong a small quantity of flour should be strewed over their backs while in the boxes and then turned out. On returning to their owners with white backs the character of the bees will be ascertained. In order to force them to enter the side boxes D through the aforesaid funnel shaped tubes N when said boxes are used as "thief takers" the aperture X in front of the hive at which the bees usually enter is closed. This is effected by having the ledge P upon which the bees light hinged to the lower edge of the inclined board Q so that it may be made to act as a shutter for closing the entrance to the hive by turning said shutter up in a vertical position—the upper edge resting against the cross piece o of the stand thus effectually closing the entrance X.

The front of the stand is closed by a perforated slide F inserted into corresponding grooves formed in parallel strips secured on the fronts of the stand—in which slide there is an opening closed by a pane of glass R and over this pane is hinged a shutter F² for darkening the interior of the stand when required.

As the air would be excluded from the hive when the shutter P is closed it must be admitted through a perforated plate that will at the same time prevent the escape of the bees which plate is inserted in the place of the slide F which is previously withdrawn from the grooves and must therefore be of sufficient size to close the opening effectually.

In order to colonize or increase the stock of bees a slide E of the following construction and arrangement is used. It consists of a rectangular board with an opening S near the middle closed by a shutter T and a depression or hollow V at the edge of said board projecting beyond the outside of the hive and serving as the ledge for the bees to light on—said depression serving as the entrance for the bees and being closed by a slide V when required.

The aforesaid colonizing slide E is used in the months of June and July when the bees are inclined to swarm. It is of no use at other times. It may be inserted between the lower box B and the stand A or between any pair of boxes.

The windows W in the several boxes are for the purpose of seeing the operations of the bees. They are darkened by thin shutters.

The grates Y in the fumigators or furnaces are for sustaining the tobacco, cloth, or other substances to be consumed for producing the smoke.

The operation of this bee house is as follows: When it is required to take a quantity of honey for use, or when the boxes B are all filled and the bees are about to commence to work in the stand A; or to swarm; or when it is desired to examine the hive; or to have access to the interior of the hive; or to colonize the bees; or for any purpose whatever, without injuring or destroying the bees, or driving them from the hive, and at the same time securing them during any one of the aforesaid operations, the shutter P must be raised and the entrance $x$ closed and the shutter F² must be opened for rendering the interior of the stand A light for attracting the bees to the said interior of the stand which the light will effectually do, the bees being previously disturbed by agitating the hive or admitting a quantity of smoke among them, or by other suitable means. The bees in attempting to escape from the hive will be arrested in the stand by the closing of the shutter P. The slides L are then withdrawn from over the passages K which will open the communications from the stand to the side chambers D. The shutter F² is then closed which darkens the interior of the stand and the side chambers being light the bees will be attracted through the passages K to the interior thereof and when all the bees are safely in said side chambers the slides L are closed which effectually secures them, the bees being supplied with air by the bellows, tubes and ventilators. A wire, thread, or thin blade is then passed horizontally through between the two upper boxes which effectually severs the comb, the upper box is then removed and the lid taken therefrom and put upon the top of that box which will be at the top of the remaining stack of boxes. The box thus removed is emptied of its honey and inserted between the lower box of the stack and the stand, the stack being previously raised a sufficient height to admit the empty box. The shutters F, P and slides L are then opened and the side chambers darkened by a cloth or other means when the bees will again be attracted back to the hive stand from which they will have free egress and ingress by the common entrance X. Should the movements of the bees be tardy in passing from the chambers to the stand they may be hastened by the admission of a few puffs of smoke from the fumigators H.

In the swarming season when it is required to colonize the bees or increase the stock the slide E must be inserted between the lower box and the stand or between any pair of boxes required. The bees will then enter at the opening V and work in the boxes. When it is discovered that the boxes are nearly filled and the bees are ready to swarm, the slides P and V must be closed and the doors T and F² opened, the latter to render the interior of the stand light and attractive and the former to allow the bees to descend into the stand. The remaining parts of the operation are the same as those before described in taking the honey. The bees being secured in the side chambers D, one of the side chambers with the bees therein may be removed to the new hive in which the colony is to be formed, the bees in the remaining chamber may be returned to the old hive in the manner before described and the shutter T again closed and an empty box inserted in place of the aforesaid swarming slide. It is preferable to insert the swarming slide about the period of swarming and to let it remain in the hive as short a time as possible, as it is liable to catch dirt and worms from its horizontal position. The colony of bees being removed the slide E should also be removed and again inserted when required.

The before described attraction side chambers D and thief takers N and the swarming or colonizing slide E may be combined and used with almost every description of bee houses in use.

What I claim as my invention and which I desire to secure by Letters Patent is—

The combination of the glazed side chambers D, fumigators H and ventilators M and funnels N, with the glazed stand A constructed, arranged and used in the manner described, or in any way substantially the same.

Z. R. HENCH.

Witnesses:
 WM. P. ELLIOT,
 E. MATIER.